United States Patent [19]

Sato

[11] Patent Number: 4,463,641

[45] Date of Patent: Aug. 7, 1984

[54] DEVICE FOR CUTTING OFF KNOTTED ENDS OF TUBE BAGS

[75] Inventor: Eiichi Sato, Hayama, Japan

[73] Assignee: Osaka Kagaku Gokin Kabushiki Kaisha, Japan

[21] Appl. No.: 354,493

[22] Filed: Mar. 3, 1982

[30] Foreign Application Priority Data

Mar. 9, 1981 [JP] Japan ................ 56-033462

[51] Int. Cl.³ .............................. B26D 7/14
[52] U.S. Cl. ...................... 83/175; 17/1 F; 30/2; 83/277; 83/909
[58] Field of Search ............ 17/1 F, 49; 30/2; 414/412; 83/18, 175, 277, 914, 909

[56] References Cited

U.S. PATENT DOCUMENTS

| 2,386,928 | 10/1945 | Brown | 83/277 X |
| 4,214,492 | 7/1980 | Hoffman | 17/1 F |
| 4,219,299 | 8/1980 | Watson | 83/175 X |

FOREIGN PATENT DOCUMENTS

51-118582 10/1976 Japan .
52-70673 5/1977 Japan .
55-116542 9/1980 Japan .

Primary Examiner—James M. Meister

[57] ABSTRACT

An annular stopper is placed against one end of the bag to prevent it from advancing, the knotted portion of the bag protruding from the stopper is pinched by a plier, both or either of the stopper and the plier is pulled to extend the portion between the peripheral portion of the bag restricted by the plier, and then the extended portion is cut by the blade of a cutter.

7 Claims, 9 Drawing Figures

DEVICE FOR CUTTING OFF KNOTTED ENDS OF TUBE BAGS

BACKGROUND OF THE INVENTION

1. Field of the Invention

This invention relates to a device for cutting a tube at each knot containing ham or sausage.

Ham and sausage charged into a tube bag undergo the heating process with their ends bound up by metallic fastening rings. These knots at the ends of each tube bag containing ham or sausage protrude sideways and hinders the wrapping process which is done before delivery. Therefore the protruded portions must be cut off to facilitate the wrapping process.

The process of cutting the protruding knots have conventionally been done manually by workers using scissors. This cutting process is very hard for the manual workers since they have to work continuously for longer hours and sometimes suffer the inflammation of a tendon sheath. The work efficiency therefore is low.

2. Summary of the Invention

The primary object of this invention is to provide a device which overcomes the aforementioned problems and which automatically cut off a large number of knots of tube bags at high speed and with accuracy.

Japanese laid open application No. P55-116,542 teaches to cut off the bound portion of the tube bag by a pair of edge tools being brought into abutting engagement with each other like a nail clipper.

However, when the bound portion is cut off, if the edge tools are pressed on the casing at a too deep position, then even the ham material will be partially removed. On the other hand, if the tools are pressed on it at a too shallow position, the casing may be cut off at an external position to the metal ring of the bound portion.

In the above Japanese laid open application No. P55-116,542, in order to prevent the above trouble, the edge tools are provided respectively with inclined surfaces which act to push the vicinity of a bound portion of the casing stuffed with the ham material to bring the edges of the tools into abutting engagement with each other while allowing these edges to escape from the ham material.

But, there is possibility of the casing being cut off either on the ham material at a too deep position, or at the metal ring, or at an external position to the metal ring, because the metal ring encroaches often upon the end portion of the casing stuffed with the ham material.

To cut off the protruding knotted ends of tube bags containing ham or sausage, it is necessary to place the blade of the cutter between the content of bag and the fastening ring. This is, however, difficult because they are very close to each other. The cutter often cuts deep into the sausage content or cuts the metal ring damaging its blade. In this way, it is very difficult to successively cut off the tube end and the metal ring without slicing off the content of sausage or ham.

The second object of this invention is to provide a device which overcomes the above drawbacks and which has a very simple and inexpensive mechanism that makes it possible to cut off only the tube ends and fastening metal rings accurately and quickly and to preclude the possibility of the cutter slicing the sausage content or hitting against the metal ring damaging the blade.

The third object of this invention is to provide a device capable of continuous use for long hours which is installed in a series of automatic production lines to automatically cut off a large number of knotted ends of the tube bags successively.

The fourth object of this invention is to provide a device which can undergo frequent cleaning by water without producing any fault or trouble.

This invention is based on the idea that the retracted turtle's neck must be drawn out before being cut off. With this invention this is accomplished by the following steps: first, an annular stopper is placed against one end of the bag to prevent it from advancing; the knotted portion protruding from the stopper is pinched by pliers; both or either of the stopper and the plier is pulled to extend the portion between the peripheral portion of the bag restricted by the stopper and the knotted end pinched and pulled by the plier; and then the extended portion is cut by the blade of cutter. Another feature of this invention is that a pair of bag cutter units are installed asymmetrically on each side of the conveyor and a pair of pushers are directed toward the cutter units so that as the conveyor feeds the sausages at certain intervals the pushers are activated to press the sausages against the cutter units to automatically and successively cut off the knotted ends of the sausages.

BRIEF DESCRIPTION OF THE DRAWINGS

Attached drawings illustrate one embodiment of this invention.

FIGS. 4 through 6 are horizontal cross-sectional views taken along the line 4—4 of FIG. 3, of which FIG. 4 illustrates the condition of device at the starting position, FIG. 5 shows the condition of device in operation, and FIG. 6 shows the condition of device when the knotted end is being cut;

DESCRIPTION OF THE PREFERRED EMBODIMENTS

The construction and actions of the device of this invention will now be detailed with one embodiment taken as an example referring to the accompanying drawings.

The object 10 containing ham or sausage in a tube bag is bound up by the metal ring 11 at its ends and in this condition is processed by heat. The bound or knotted portion 10a is projected outward from the center at one end of the object 10. The peripheral portion 10b contacts the inner side of the ring 11 at the knotted portion 10a. The peripheral portion 10b containing the meat swells concentrically with the ring 11. The knotted portions 10a are almost equal in size and shape but the size of the peripheral portion 10b varies depending of the diameter of the tube object 10.

The annular stopper that blocks the advancement of the peripheral portion 10b at one end of the tube bag may be constant in diameter. But it is preferable that the diameter of the annular stopper be variable according to the diameter of the pheripheral portion 10b so as to block the peripheral portion 10b in optimum condition to enable the smooth cutting work.

In the example embodiment shown, the annular stopper is formed of a pair of semicircular members 12 and 13. Each semicircular member is cut with a female thread hole in the upper portion. A threaded rod 14 is formed with a clockwise thread 14a at one end and with a counterclockwise thread 14b at the other end. The threaded rod 14 is screwed into each of the female thread hole of the semicircular members 12, 13. A pair of plates 15 and 16 are provided to hold the semicircular members at the intermediate portion therebetween so as to prevent the semicircular members from rotating about the threaded rod 14. The rear plate 15 has brackets 15a and 15b projecting from the ends to support the threaded rod 14. Projecting rearwardly from the back side of the intermediate portion of the plate 15 are a pair of support shafts 15c and 15d which are mounted on a pair of thrust bearings 17 and 18 secured to the upper frame 77 in such a manner that the shafts can be displaced in the axial direction. The front plate 16 is fixed to the rear plate 15 by the set screw 19. Knob 14c is provided to one end of the threaded rod 14 to turn the rod 14.

Figure 1:
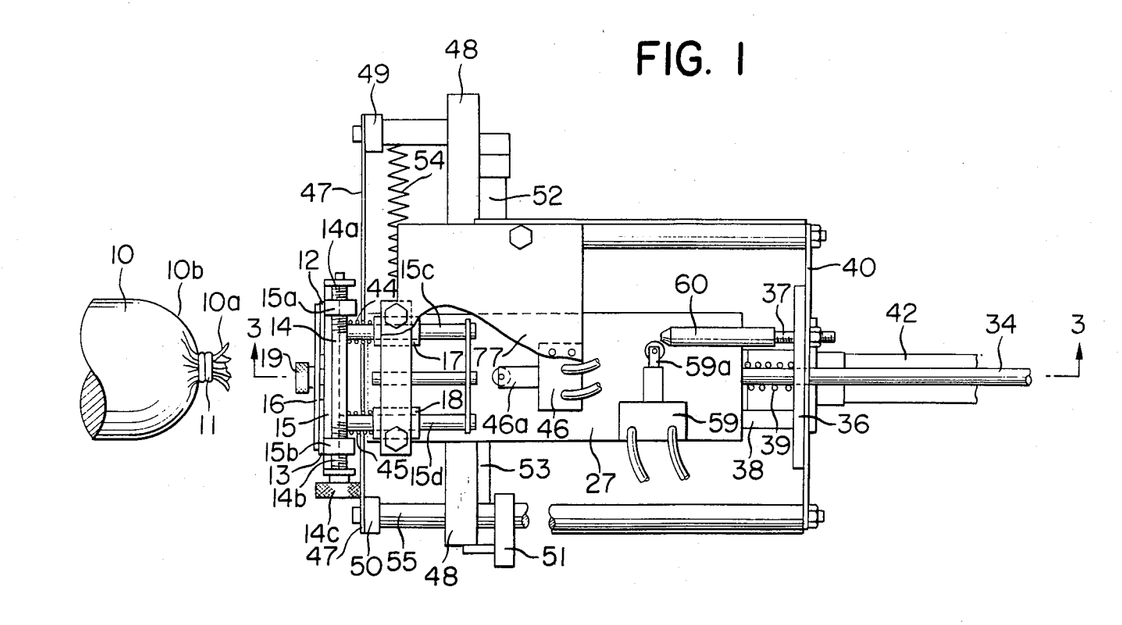
FIG. 1 is a plan view of the knot cutting device.
Figure 2:
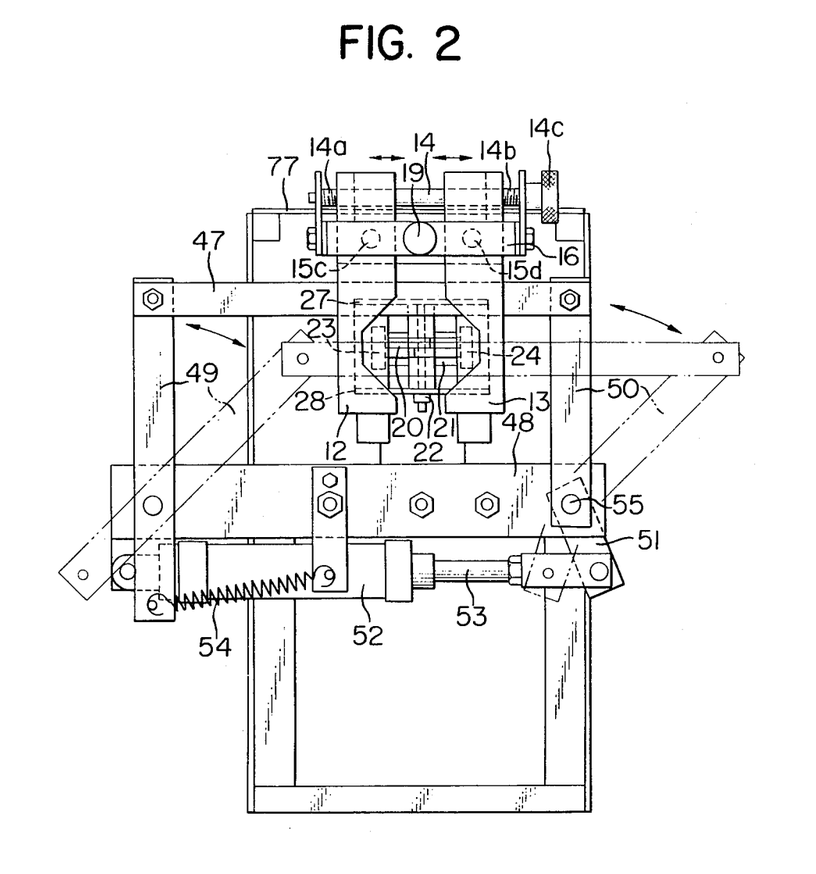
FIG. 2 is a front view of FIG. 1.

Turning the knob 14c by fingers after loosening the set screw 19 causes the pair of semicircular members 12 and 13 to move the same distance but in the opposite directions with the center lines aligned as shown in FIG. 2. This makes it possible to move the pair of semicircular members corresponding to the size of the peripheral portion 10b at one end of the bag.

Figure 3:
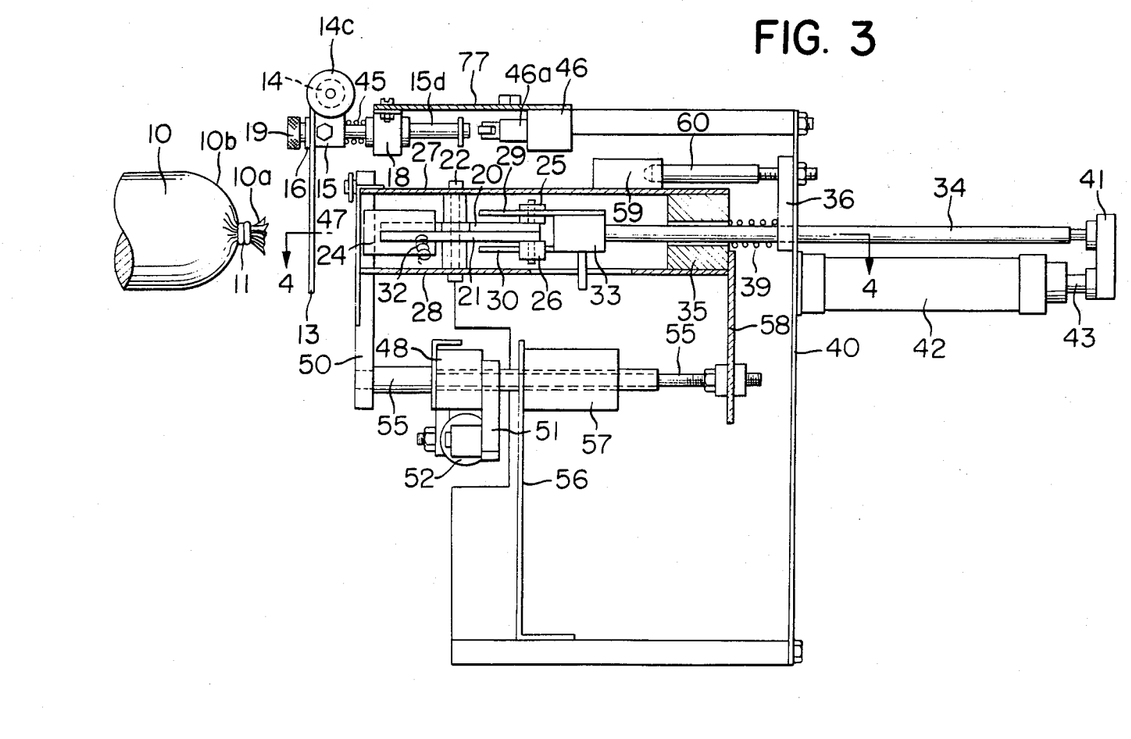
FIG. 3 is a vertical cross-sectional view taken along the line 3—3 of FIG. 1.
Figure 4:
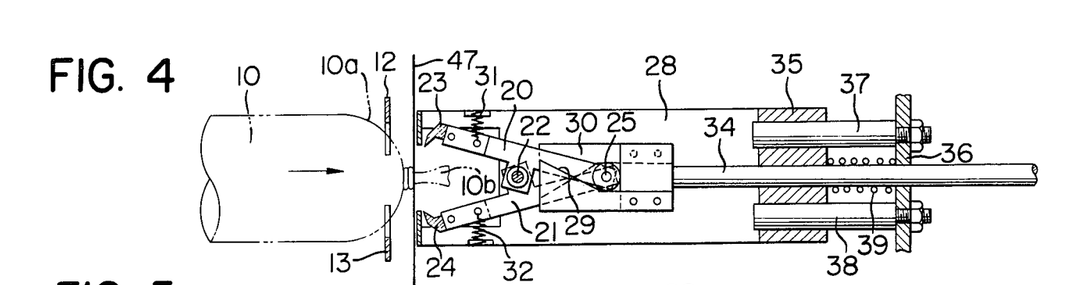

The plier consists of a pair of levers 20, 21, a support shaft 22 rotatably supporting the intermediate portion of the levers, claws 23, 24 shaped like a nail puller, and cam followers 25, 26 provided at the rear ends of the levers. The support shaft 22 is mounted at its upper end to the upper plate 27 and at its lower end to the lower plate 28. The pair of cam followers 25, 26 are urged against the back of the plate cams 29 and 30 by the springs 31 and 32. Therefore, the claws 23, 24 are usually open. The rear ends of the plate cams 29, 30 are secured to the common block 33 which is fixed to the front end of the power transmission shaft 34. The power transmission shaft 34 is supported by two thrust bearings 35 and 36 mounted one after the other. The front bearing 35 is secured at the front surface to the upper plate 27 and at the lower surface secured to the lower plate 28. The front thrust bearing 35 is supported by the guide shafts 37 and 38 projecting from the rear thrust bearing 36 in such a manner that the rear thrust bearing 36 can be moved in the direction of thrust. A compression spring 39 is interposed between the two bearings to set them apart at all times. The rear thrust bearing 36, as shown in FIG. 3, is secured to the rear frame 40. The rear end of the power transmission shaft 34 is connected to the piston rod 43 of the air cylinder 42 through the return plate 41. The air cylinder 42 is fixed to the rear frame 40.

The action of the air cylinder 42 is as follows. The semicircular members 12 and 13 are urged toward the front at all times by the springs 44 and 45 interposed between the rear plate 15 of the semicircular members and the bearings 17 and 18. When the peripheral portion 10a of the bag pushes the semicircular members 12 and 13 against the force of the springs 44 and 45, the support shafts 15c and 15d retract to push the action rod 46a of the microvalve 46 thus opening the valve 46. The opening of the valve 46 activates the air cylinder 42 projecting its rod rearward. This in turn causes the power transmission shaft 34 which is connected with the air cylinder rod 43 to retract, pulling the plate cams 29 and 30 backward.

Figure 5:
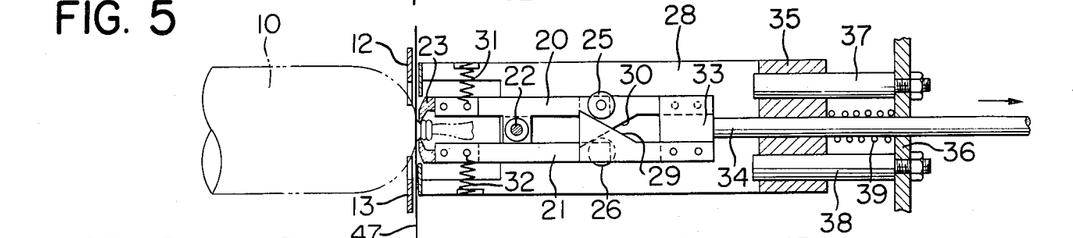

At the initial stage of the retracting stroke, the retracting movement of the pair of plate cams 29 and 30, as shown in FIG. 5, expands the gap between the cam followers 25 and 26 that are contacting the plate cams. This in turn closes the claws 23 and 24 against the force of the springs 31 and 32 to catch the knotted portion 10a of the bag between them (see FIG. 5).

Figure 6:
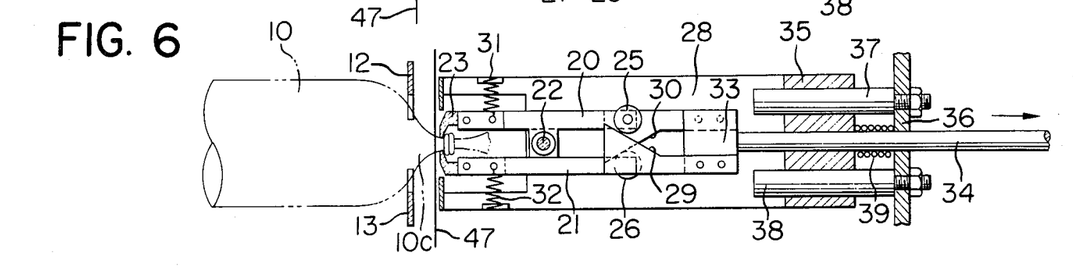

When the claws 23 and 24 firmly grip the knotted portion 10a and this gripping action does not proceed any more due to the resistance of the knotted portion 10a thus gripped, the pliers as a whole including the upper and lower plates 27 and 28 retract backward with a certain gripping pressure of the claws maintained (see FIG. 6).

As a result of the gripping and retracting actions, the portion of bag between the peripheral portion 10b of the bag restricted by the semicircular members 12 and 13 and the knotted portion 10a pulled by the claws 23 and 24 expands as shown at 10c. There is no metal ring 11 nor the meat near the extended portion 10c.

The cutting blade 47 is adapted to move between the semicircular members 12, 13 and the claws 23, 24 of the pliers. That is, by the action of the parallelogram which consists of the blade 47, the base member 48 and a pair of links 49 and 50 connecting the ends of the blade and the base member, the blade 47 moves from the position shown with the solid line of FIG. 2 to the position shown with the two-dot line to cut the extended portion 10c.

One example of the blade action is described below. A lever 51 forming a crank for the link 50 is connected to the piston rod 53 of the air cylinder 52. As the rod 53 is pulled into the air cylinder 52 against the force of the spring 54, the link 50 integral with the lever 51 inclines to the position shown with the two-dot line, moving the blade 47. The support shaft 55 pivotally supporting the base member 48 and the link 50 extends backward to pass through the thrust bearing 57 fixed to the front frame 56. The rear end of the support shaft 55 is mounted to the plate 58 integral with the plier supporting thrust bearing 35 so that it can be finely adjusted. Therefore, the relative position of the claws 23, 24 and the blade 47 is always constant regardless of their rearward displacement.

The air cylinder 52 that activates the blade 47 is actuated by the opening of the microvalve 59 secured to the upper plate 27. The valve 59 is opened when the action rod 59a of the valve comes into contact with and is pressed down by the cam rod 60 projecting forward from the rear frame 40 as the upper plate 27 moves rearward.

The construction and actions of the automatic bag knot cutting device are as follows.

Figure 7:
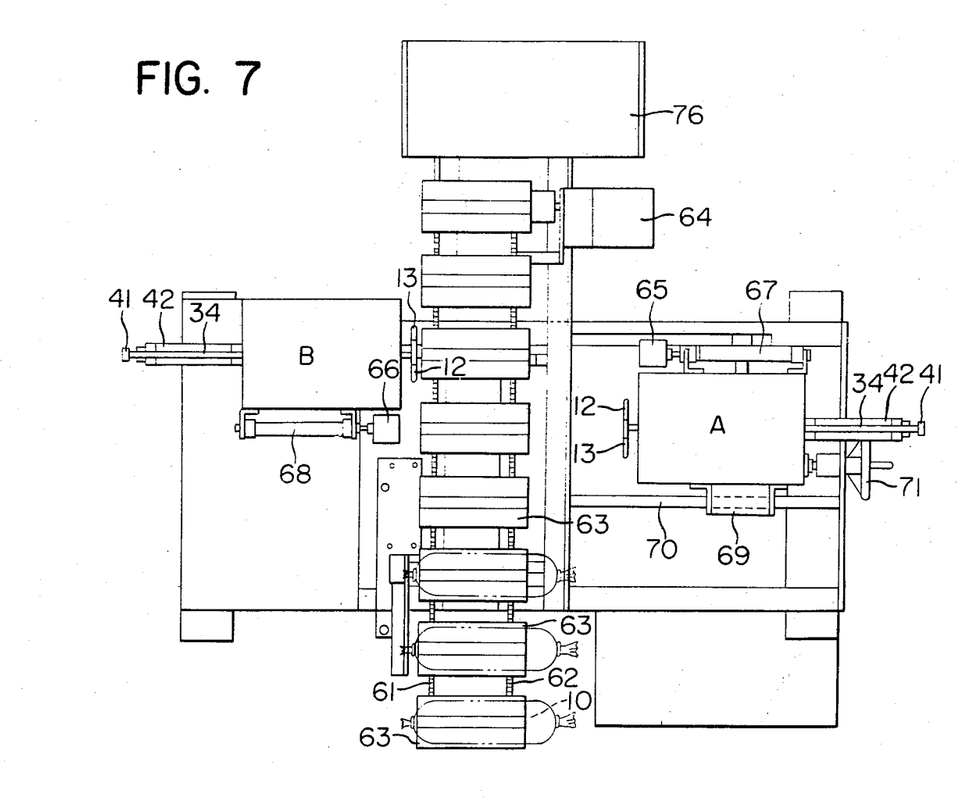
FIG. 7 is a plan view of the automatic continuous cutter device for cutting the knotted ends of the bags.
Figure 8:
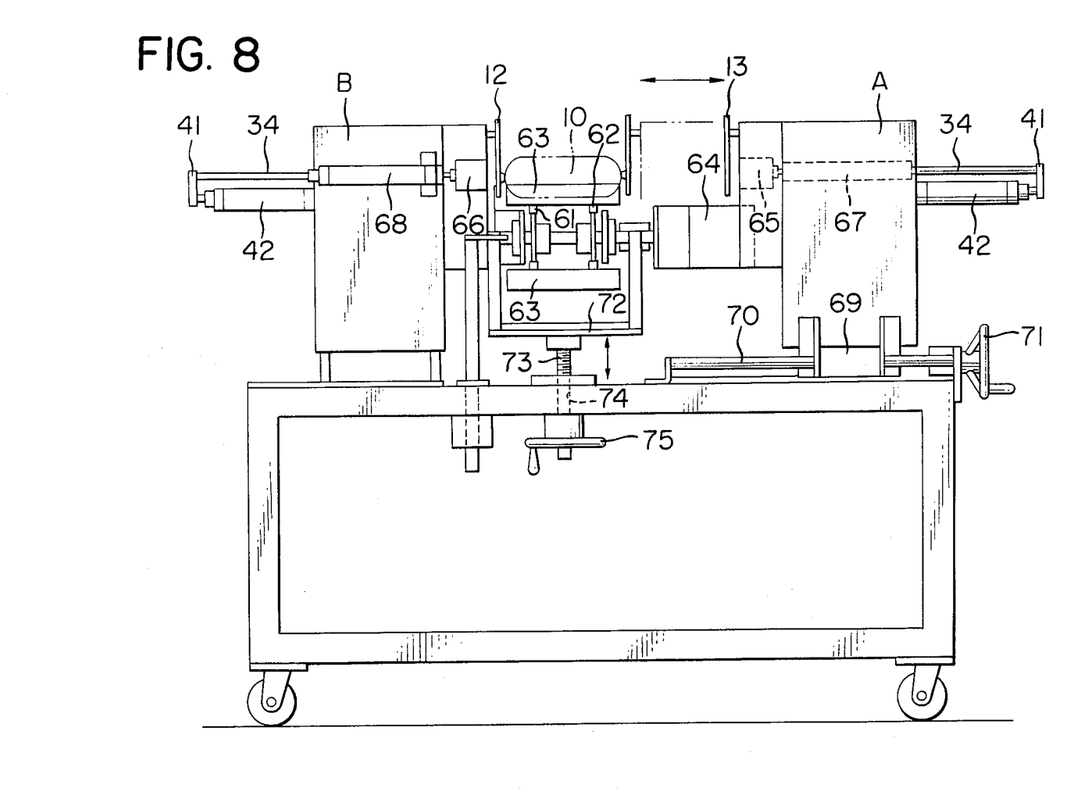
FIG. 8 is a front view of FIG. 7.
Figure 9:
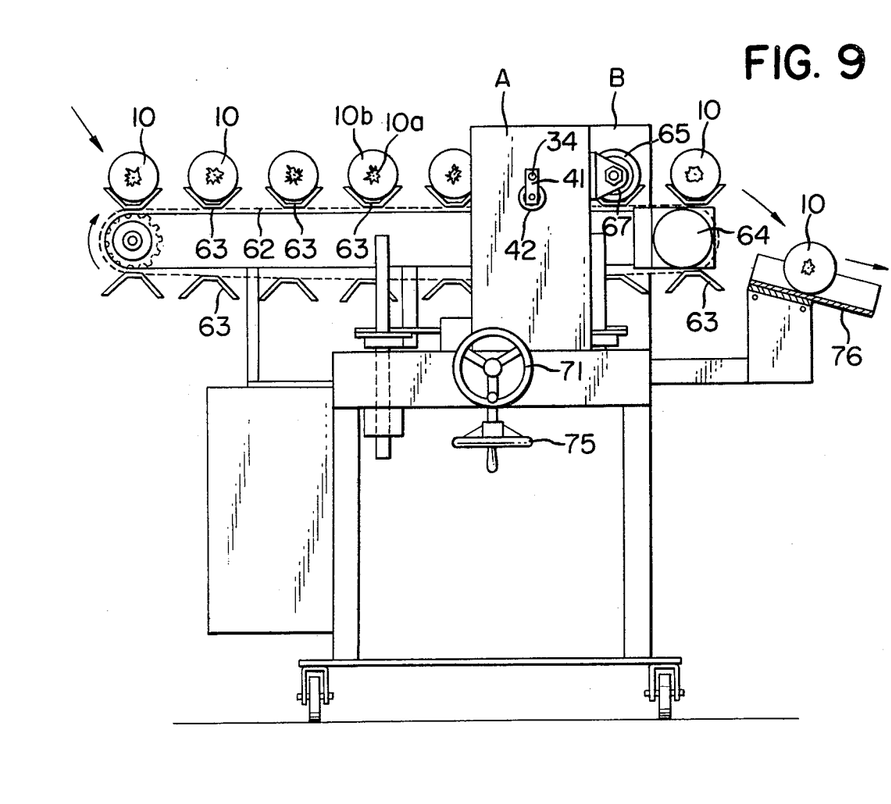
FIG. 9 is a right-side view of FIG. 7.

In FIGS. 7 through 9, a series of carrier plates on which to place the objects 10 are mounted at regular intervals on the conveyor consisting of two parallel endless chains 61 and 62. Motor 64 with a solenoid clutch (not shown) gives the conveyor a pause of a certain duration and an advancement equal in distance to the interval between the carrier plates. This intermittent movement with pause and advancement alternating is repeated.

One of the knot cutter units A is installed at one side of the conveyor and is directed toward the stop position of the carrier plate on the conveyor. The other knot cutter unit B is installed on the other side of the conveyor and is directed toward the stop position of the carrier plate on the conveyor. The two knot cutter units are arranged deviated from each other by at least one mounting plate so that they act toward the different stop positions of the carrier plates.

A pair of pushers 65 and 66 for pushing sideways the objects 10 placed on the carrier plate 63 are provided to the cutter units A and B so that these pushers face the cutter units on the other side of the conveyor. The pushers 65 and 66 are made to project toward the conveyor each time the conveyor is halted. Designated 67 and 68 are the air cylinders for the pushers.

The thrust bearing 69 is provided under the cutter unit A and is guided along the guide rod 70 mounted on the frame. By turning the handle 71, the position of the unit A with respect to the carrier plate 63 can be adjusted along the guide rod 70 according to the length of the object 10.

As shown in FIG. 8, a threaded rod 73 extends downward from the support frame 72 of the conveyor and is screwed into the female thread hole 74 formed in the frame. By turning the handle 75 to rotate the threaded rod 73, the height of the conveyor can be adjusted according to the size of the diameter of the object 10. Designated 76 is a chute for sending out the processed objects with their knots cut off.

While the objects 10 are successively fed onto the carrier plates 63 on the conveyor which advances intermittently, the pair of pushers 65 and 66 project from the side of the conveyor toward the carrier plates 63 when the carrier plates 63 stop. Thus, the object on the carrier plate, upon reaching the position of the pusher, is pushed sideways by the pusher. Since the cutter units A and B are provided on the opposite sides of the conveyor and are aligned with the pushers, the peripheral portion 10b of the object 10, when pushed by the pusher, is pressed against the semicircular members 12 and 13.

In FIG. 7, the object 10 is first pushed by the pusher 66 on the left-hand side and pressed against the semicircular members 12 and 13 of the right-hand side cutter unit A so that further advancement of the object is prevented. At the same time, the displacement of the semicircular members 12 and 13 caused by the pressure of the object 10 actuates the air cylinder 42 closing the claws 23 and 24 of the pliers. Then, the knotted portion 10a on the right side of the bag is pulled rearward by the pinching claws. As a result, the air cylinder 52 is actuated to move the blade 47 cutting the extended portion 10c of the bag.

Upon completion of the action of the cutter unit A on the right side, the carrier plates 63 advances by one interval, that is, the object with its right-hand knotted end cut off also moves to the next position where it stops.

At the same time that the object 10 stops at the next position, the pusher 65 on the right-hand side projects from the air cylinder 67 to push the object 10 against the semicircular members 12 and 13 of the cutter unit B on the left-hand side. The cutting operation as described above is repeated again to cut off the knotted portion 10a on the left side.

As the pair of pushers 65 and 66 and the pair of cutter units A and B repeat the above actions, the objects carried on the conveyor are cut successively at the knotted portions first on the right side and next on the left side. The objects with both knotted ends cut off are further carried by the conveyor to be thrown onto the chute 76.

As described above, this invention is characterized in that the portion of the bag between the peripheral portion 10b at one end of the bag and the knotted portion 10a is extended by the annular stoppers 12, 13 and the claws 23, 24 of the pliers and the extended portion 10c is cut by the blade 47. This enables the blade 47 to cut only the knotted portion accurately and quickly without hitting against the metal ring 11 or cutting the meat portion. Therefore the blade 47 can be protected from damage and the charged content of the tube bag from being wasted. Furthermore, since the repeated cutting process is automated, the efficiency in the production of ham or sausage is significantly improved.

What is claimed is:

1. A device for cutting off the knotted ends of tube bags comprising: an annular stopper against which the peripheral portion of a bag is pressed; pliers having claws provided at a front end portion thereof arranged opposite to the stopper for pinching the knotted end of the bag projecting from the stopper; a pinch-and-retract means which convert the early stage of its retracting movement, caused by the peripheral portion of the bag abutting against the stopper, into the pinching action of the pliers' claws and which, as soon as the pinching action is achieved, convert the remaining stage of its retracting movement into the retracting of the pliers themselves, with the pinching action of the claws maintained; and a cutting blade which is actuated by achievement of the retracting movement of the pliers to cut the extended portion between the peripheral portion of the bag restricted by the stopper and the knotted end of the bag pinched and pulled by the pliers.

2. A device as set forth in claim 1, wherein the annular stopper is formed by a pair of semicircular members and the gap between the pair of semicircular members is adjusted with their centers aligned by turning a threaded rod according to the size of the diameter of the bag, the threaded rod being formed with a clockwise thread and a counterclockwise thread at its ends.

3. A device as set forth in claim 1, wherein the claws of the pliers are disposed opposite to each other so that they can pinch the portion between the bag content and the fastening ring at the knotted end of the bag.

4. A device as set forth in claim 1, wherein the pinch-and-retract means for the pliers is accomplished by a cam mechanism which converts the retracting movement of an air cylinder rod into the opening of the rear portions of the pliers.

5. A device as set forth in claim 1, wherein the cutting blade is a single straight blade which is incorporated into a parallelogram link so that the blade moves parallelly but in the inclined direction to cut the extended portion of the bag.

6. A device as set forth in claim 4, wherein the annular stopper is mounted to be retractable, and there is provided a valve for actuating the air cylinder rod which is operated with the retraction of the stopper when the latter is pressed by the peripheral portion of the bag.

7. An automatic device for continuously cutting knotted ends of bags comprising: a conveyor having a number of carrier plates arranged parallelly at regular intervals mounted thereon, the conveyor repeating the intermittent movement, alternately, of a halt of a certain duration and an advancement of a certain interval; a pair of bag knotted ends cutting units installed on the opposite sides of the conveyor, the both units being directed toward the stop position of the carrier plates on the conveyor and arranged so as to act toward the carrier plate stop positions, the pair of cutting units further comprising a retractable annular stopper blocking the advancement of the peripheral portion of the bag, pliers having claws at a front end portion thereof arranged opposite to the knotted end of the bag so as to pinch the knotted end projecting from the stopper, pinch-and-retract means for the pliers activated with the retraction of the stopper when the latter is pressed by the peripheral portion of the bag, the pinch-and-retract means converting the early stage of its retracting movement into the pinching action of the plier claws and, as soon as the pinching action is achieved, converting its retracting movement into the retracting movement of the pliers themselves with the pinching action maintained; a cutting blade actuated against the force of a spring to cut the extended portion of the bag between the peripheral portion of the bag restricted by the stopper and the knotted end of the bag pinched and pulled by the pliers as the plier is retracted; and a pair of pushers arranged across and on the opposite sides of the conveyor and directed toward each cutting unit, the pair of pushers being adapted to project to push a bag each time the conveyor stops.

* * * * *